April 16, 1957     F. J. BAUM, JR     2,788,702

MEASUREMENT OF LIGHT SCATTERING

Filed Sept. 24, 1951     3 Sheets-Sheet 1

INVENTOR:
Frederick Jay Baum, Jr.,
BY
ATTORNEY.

April 16, 1957     F. J. BAUM, JR     2,788,702

MEASUREMENT OF LIGHT SCATTERING

Filed Sept. 24, 1951     3 Sheets-Sheet 2

INVENTOR
FREDERICK JAY BAUM, JR.

BY James H. Ryan

ATTORNEY

April 16, 1957  F. J. BAUM, JR  2,788,702
MEASUREMENT OF LIGHT SCATTERING
Filed Sept. 24, 1951  3 Sheets-Sheet 3

INVENTOR
FREDERICK JAY BAUM, JR.

BY James H. Ryan

ATTORNEY

****

United States Patent Office 2,788,702
Patented Apr. 16, 1957

2,788,702

MEASUREMENT OF LIGHT SCATTERING

Frederick Jay Baum, Jr., Wilmington, Del., assignor, by mesne assignments, to Leeds & Northrup Company, a corporation of Pennsylvania Application September 24, 1951, Serial No. 247,927

6 Claims. (Cl. 88—14)

This invention relates to the measurement of light scattering and, more particularly, to an optical system whereby measurement of light scattering at small angles may be effected.

Measurement of the light scattered when a beam of light is passed through a transparent medium containing small particles (or other inhomogeneities), has been used by a number of investigators to characterize the particles. The angular distribution of the intensity of scattered light varies with the size of the particles; the smaller the particles, the more uniform the distribution of light scattering. Only a fraction of the light passing through the sample is scattered but, by measuring the intensity of the scattered light at various angles, it is possible to obtain information on the size of the particles in the sample and their relative proportions.

With the means heretofore known, the measurement of scattered light at angles less than about 2° to the main beam has, in so far as known, not been possible. In fact, most of the prior measurements have been made at angles above about 20°. Furthermore, the data obtained in light scattering studies at angles appreciably below 20°, and apparently with increasing effect as the angle with the main beam decreases, are not particularly sharp or pure and accordingly are interpretable only with difficulty. The reason for this is that the diffraction caused by the slits necessary to define the narrow beam of light required and which appears on the edge of the light beam, is of sufficient intensity and complexity to obscure the measurement of the light scattered in the region close to the beam.

An object of the present invention is to provide an improved optical system for the measurement of light scattering. A further and more specific object is to provide such an optical system whereby measurement of light scattering at smaller angles than could feasibly be measured heretofore, may be effected. Other objects of the invention will be apparent hereinafter.

The above objects are accomplished according to the present invention by providing an optical system which essentially comprises a source of a narrow light beam, a sample placed in the path of the beam, a convex lens placed in the path of the beam between the source of the beam and the sample, and a receiving light aperture movable along the arc passing through the light beam and described by using the sample as the center and, as the radius, the distance between the sample and the focus of the light beam conjugate to the source of the beam. The light beam is preferably monochromatic or nearly so because of the exact characterization of the dimensions of discrete particulate inhomogeneities obtainable thereby in contrast to the uncertainties introduced by the false range of dimensions indicated when light of more than one wave length is used.

In this optical system, the source of the light beam, normally an entrance light aperture, and the receiving light aperture are at conjugate foci of the lens.

Using the optical system described above, it has been found that light scattering measurements carried out at small angles to the main light beam, i. e., less than 10° and preferably less than 5° from the light beam, produce information capable of characterizing inhomogeneities greater than about one micron in size. Measurements at even smaller angles to the main beam, e. g., 1°, 0.1°, 0.05° can be successfully and routinely carried out with this system giving information on the important inhomogeneities greater than 1.0 micron in size up to about 200 microns. With the heretofore known optical systems for measuring light scattering, such characterization has not been possible and data have only been obtainable for inhomogeneities smaller than about one micron in size. The ability of the instant optical system to characterize inhomogeneities greater than one micron in size is of outstanding importance since such particles are those of major interest in many commercial fields. Specifically, inhomogeneities of this order of magnitude in size are of relatively great importance in the behavior of many commercial products such as paints, pigments, polymer solutions for the preparation of coatings, self-supporting films, fibers, and the like. The optical system of this invention, when using certain apparatus readily available, affords an instantaneous and continuously recorded set of data on the characteristics of such particulate inhomogeneities and thus it is an important tool in the physical and chemical art which until now has been lacking.

The invention will be further described in detail with reference to the accompanying drawing wherein.

In these figures, the same numeral represents the same part.

Figure 1:
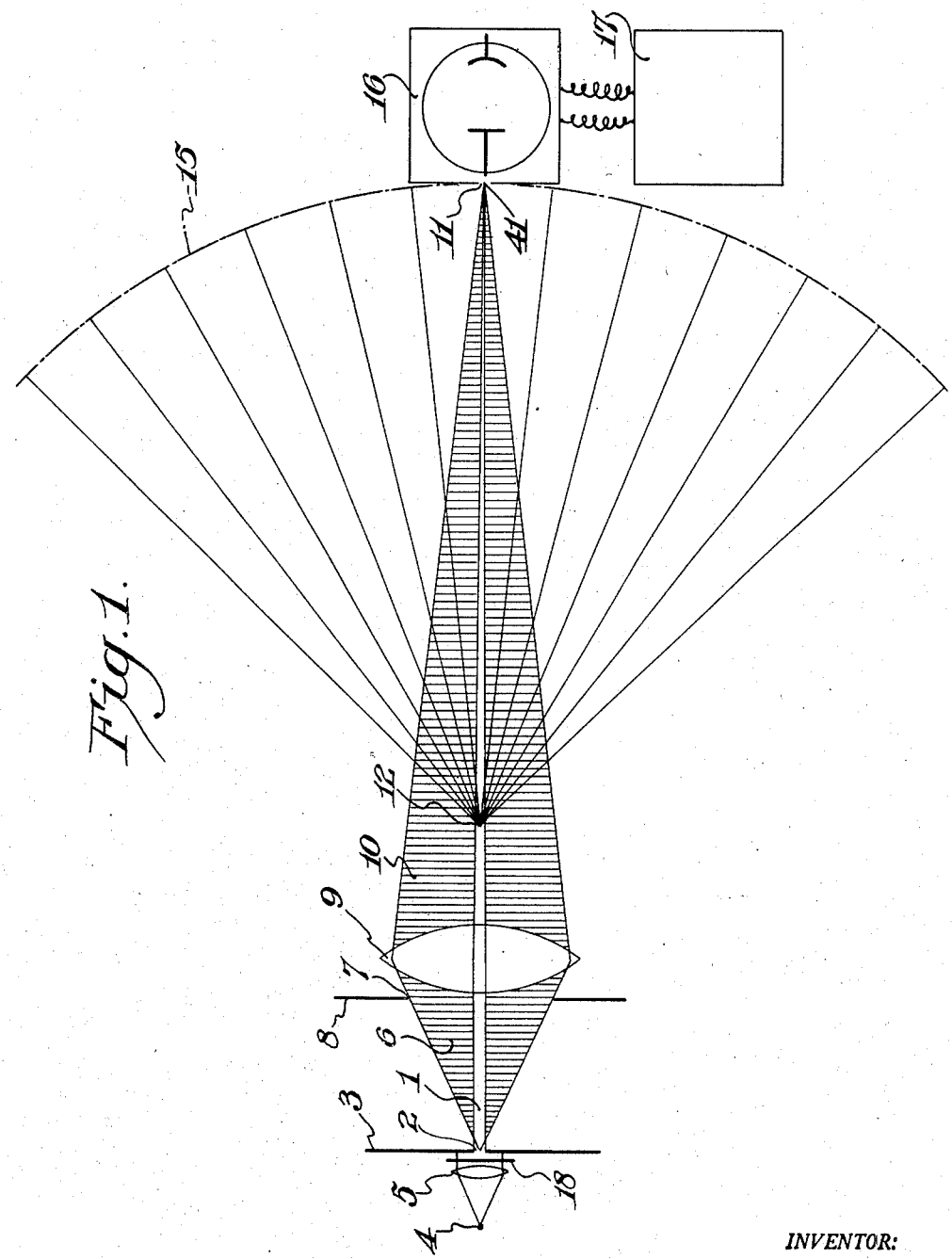
Fig. 1 is a top elevation, primarily schematic, of a specific embodiment of the present invention.

Referring to Fig. 1, a narrow monochromatic light beam 1 is provided by illuminating the entrance light aperture 2 in diaphgram 3 (hereinafter called "the source") by light from a primary source 4 which is collimated by lens 5. In the optical system to be described, the entrance light aperture 2 is the source of light and this aperture may be a circular, square, rectangular, or otherwise shaped aperture that will provide the narrow beam 1. Generally, a narrow rectangular slit provides the most satisfactory beam and, in Fig. 1, this slit would be vertically disposed.

Emerging from the aperture 2 is not only the narrow light beam 1 but also a less intense diverging diffracted cone 6, the latter being limited by aperture 7 in diaphragm 8. Both the beam 1 and diffracted cone 6 pass through the convex lens 9 centered in the path of beam 1. The purpose of the aperture 7 is to reduce stray light to a minimum, i. e., light outside of cone 6 is prevented from becoming a source of stray light which tends to mask the light effects which it is desired to measure. Obviously, the aperture 7 must be larger than the light beam 1 and, to be effective, should be small enough to limit the cone 6 so as to prevent light from striking the edges of the lens 9 and thereby produce scattered light.

The diverging diffracted cone 6 upon passing through the lens 9 becomes a converging diffracted cone 10 which converges to a focus at point 41 where the light beam 1 is also focused. The entrance light aperture 2 and the point 41 are located at conjugate foci of lens 9. A sample 12 is placed in the path of light beam 1 between lens 9 and point 41. This sample gives rise to scattered light which is to be measured. Its distance from lens 9 is not critical although it is advantageous that it be as close to lens 9 as practical in order to increase the distance between the sample 12 and point 41 in any given system.

The scattered light originating at sample 12 is measured along the arc 15 which passes through the point 41 and is described by using the sample 12 as the center and, as the radius, the distance between sample 12 and point 41. The measurement is effected by means of a light receiving aperture 11 movable along the arc 15. Normally, this aperture 11 will be a narrow rectangular slit vertically disposed to correspond to the position of the entrance light aperture 2 although its specific shape, as is the case with the entrance aperture, is not critical.

Figure 2:
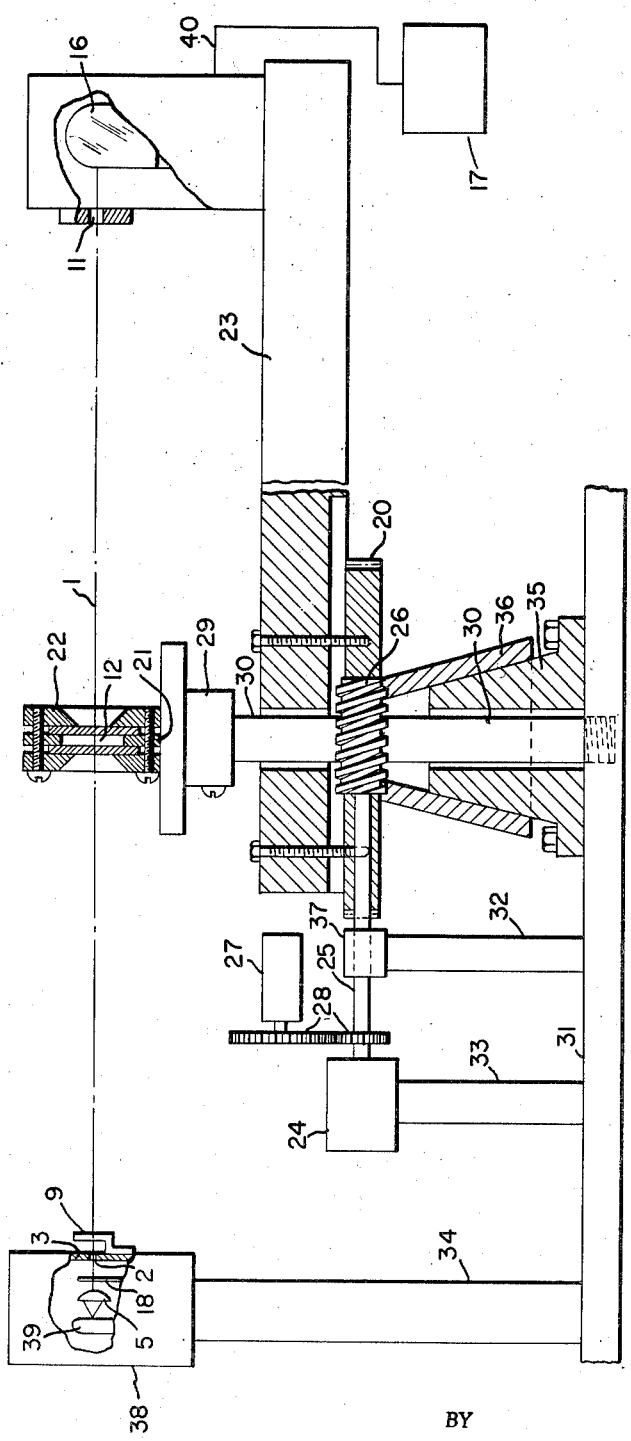
Fig. 2 is an elevation, largely schematic and partly in section, of apparatus embodying the optical system of the invention.
Figure 3:
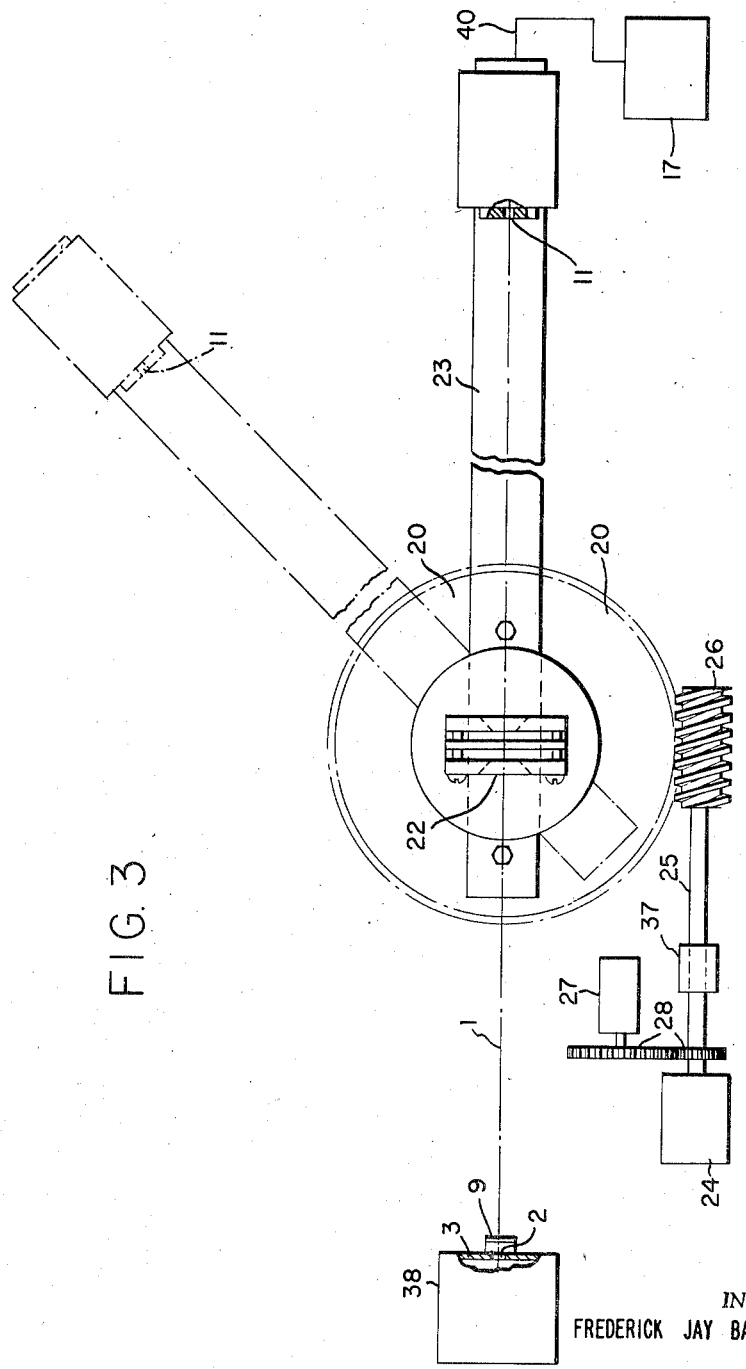
Fig. 3, also partly in section, is a schematic plan view of the apparatus of Fig. 2. The dotted section of this figure represents an alternate position of the movable arm.

The entire angular range to be measured, for example, from −40° to +140° relative to the light beam 1, is scanned by the light receiving aperture 11 moving along the arc 15 which movement may readily be effected by any convenient means. A simple means of accomplishing this is shown in Figs. 2 and 3. These figures disclose a rotatable turntable 20 the axis of which passes through the point 21 where cell 22, containing sample 12, is positioned. An arm 23 is attached to turntable 20 and carries the light-receiving aperture 11 and associated apparatus such as photoreceiver 16. Photoreceiver 16 is attached through suitable wiring 40 to stationary amplifier-recorder 17. Uniform drive of turntable 20 and arm 23 is secured from synchronous motor 24 through driveshaft 25 and worm 26. Angle indicator 27, actuated by gearing 28 from the driveshaft 25, shows the positioning of turntable 20.

Cell 22 is mounted on stationary column 30 by holder 29. Column 30 is in turn fastened to base 31 which also serves to support and position columns 32, 33 and 34 in spaced relation. Also connected to base 31 is stationary cone 35 coaxial with column 30. Conical bearing 36 rotatably engages cone 35 and retains turntable 20 in position. Turntable 20 is arranged to turn around column 30 on bearing 36.

Column 32 supports bearing 37 through which passes driveshaft 25. Column 33 supports motor 24. Column 34 positions box 38 which, by means of diaphragm 3, defines aperture 2. Within box 38 is a source 39 of light, preferably monochromatic, collimating lens 5 and optical attenuator 18. Source 39 corresponds to the primary source of Figure 1. Lens 9 may be mounted directly on box 38 in front of aperture 2 in a holder as shown.

In so far as this optical system is concerned, the specific apparatus including the light receiving means and means for suitably converting the scattered light as a function of intensity to mechanical or electrical energy and suitably amplifying and recording these intensity variations, is not critical. Illustrated in the figures is a photoreceiver 16 having a light receiving aperture 11. This photoreceiver can be, for example, an electron multiplier phototube such as RCA tube 1P21 or 5819. The photoreceiver 16 is mounted on an arm attached to a rotating turntable as mentioned above or in some equivalent manner so that it travels along the arc 15. A stationary amplifier-recorder 17, for example, an electronic amplifier and an electronic recorder which can be combined in a unit such as the "Speedomax G Strip-Chart Recorder" of Leeds & Northrup Company, is electrically connected to the photoreceiver 16 by suitable leads, coaxial cables being desirable in view of the degree of sensitivity of the apparatus involved. The photoreceiver 16 traveling along the arc 15 will measure and, together with the stationary amplifier-recorder 17, will continuously record the angular distribution of the intensity of scattered light originating at 12.

The purpose of this optical system is to measure scattered light originating at sample 12, especially in the vicinity of the illuminating light beam 1 near the point 41 where diffraction effects are relatively intense and have prevented previous work at small angles. By the use of this optical system, such diffracted light originating at entrance light aperture 2 is focused on the light beam 1 and effectively removed from the measurement. This improved system thus permits continuous measurement of scattering light as a function of angle and free from the disturbance of diffracted light originating at the illuminating aperture 2.

Because the intensity of scattered light various with the angle from the main beam, with the light scattered at the very low angles being much stronger in intensity by factors approaching a million, the present system and the apparatus using it are much more convenient to operate in the broad angular range if means are supplied for controlling the intensity of the light beam or, alternatively, controlling the amount of amplification involved in the electron multiplier phototube. The intensity of the light beam can be simply controlled by suitable rheostats or other means of controlling the input electrical energy to the original light source. Alternatively, the intensity of the light beam 1 may be controlled by the use of an optical attenuator 18 conveniently operated mechanically by a cam and lever system permitting the rapid insertion into or withdrawal from the entrance light beam 1 of neutral filters in selected geometric steps, thus controlling the intensity of the light falling on the photoreceiver 16. Such an attenuator using as few as five filters permits the control of the light intensity from unity to $1/500,000$ in geometric steps of $\frac{1}{2}$ in a few seconds. Such an attenuator adds materially to the overall ease of operation of this optical system in the broad angular range.

It will be understood that the optical system illustrated in the drawing is merely a specific embodiment of the present invention which broadly comprises a source of a narrow, preferably monochromatic, light beam, a sample placed in the path of the beam, a convex lens placed in the path of the beam between the source of the beam and the sample, and a receiving light aperture adapted to be moved along the arc passing through the light beam and described by using the sample as the center and, as the radius, the distance between the sample and the focus of the light beam conjugate to the source of the beam.

This optical system is not dependent upon the specific means shown in the drawing for providing the light beam 1, as any other means for providing an intense, narrow, monochromatic light beam may be used. Further, although advantageous to use, the diaphragm 8 with aperture 7 for limiting the diverging diffracted cone 6 of light is not essential. Obviously, other means of measuring and recording the scattered light may be employed so long as the light receiving aperture travels along the arc 15.

The center of the arc 15, being the sample 12, and the radius of said arc being equal within reasonable error of measurement, e. g., ±0.1–1.0%, to the distance between sample 12 and the point 41 on the light beam 1 which point is conjugate to the source (entrance light aperture 2) of the light beam 1, are both highly critical factors in this system. On the other hand, the three distances (a) from lens 9 to sample 12, (b) from sample 12 to the point of focus 41, and (c) from the source of the light beam (aperture 2) to lens 9, are not critical and will be determined primarily by practical considerations. For practical purposes, distances (a) and (c) are preferably as short as feasible with the limiting factor, if any, being the criterion of convenience in assembling the system, particularly with regard to the sample which usually is in a cell desirably capable of being insulated, heated, cooled, and the like, and to which obviously accessibility is essential. Distance (b) is preferably as long as feasible since increased length from theoretical considerations should result in the capability of more accurately measuring intensities of scattered light close to the main beam.

Of course, one would not build an instrument with this distance cumbersomely long and, since the intensity of the light at the light receiving slit decreases with increased length, this may also be a limiting factor.

The outstanding advantage of the present invention is that it provides a highly practical and convenient means of measuring light scattering at smaller angles than has heretofore been possible. This result follows from the use of the convex lens and the positioning of the light receiving aperture at the point of focus of the lens conjugate to the light source whereby the diverging diffracted cone of light originating at the light source is focused at the point where the light receiving aperture is positioned and, hence, difficulties in measurement of the intensity of scattered light caused by this diffracted light are reduced to a minimum.

As many apparently widely different embodiments of this invention may be made without departing from the spirit and scope thereof, it is to be understood that the invention is not limited to the specific embodiments thereof except as defined in the appended claims.

The invention claimed is:

1. In apparatus for measuring the intensity of light scattered at various angles from a sample of light-scattering material, an optical system comprising: (1) a lens for converging light; (2) light source means, including an entrance aperture, for producing a narrow beam of light, said entrance aperture being positioned to direct the beam through said lens, the distance between said entrance aperture and said lens being greater than the focal length of the lens whereby a first focus located at the entrance aperture and a second focus located at a point beyond the lens constitute conjugate foci; (3) light measuring means, including a light-receiving aperture in spaced relation with the lens, said light-receiving aperture being movable in an arc of a circular path which includes said second focus, the center for said arc being a point between said lens and said focus and on the optical axis determined by said conjugate foci and said lens, said point serving to predetermine the positioning of the sample so that, when positioned in accordance therewith, the sample scatters light from said narrow beam; and (4) means integral with said apparatus for moving the light-receiving aperture in said arc whereby, in cooperation with the remainder of the light-measuring means, the intensity of the light scattered at various angles within an angular range around a so-positioned sample can be determined.

2. The invention of claim 1 in which the entrance aperture and the light-receiving aperture are sufficiently narrow and so arranged that, at angles greater than 0.05° to the axis of said light beam, only light scattered by the sample is received by the light-measuring means, and only at angles less than 0.05° to the axis of said light beam are unscattered light and light diffracted at said entrance aperture received by said measuring means.

3. The invention of claim 1 in which both the entrance and the light-receiving apertures are rectangular slits.

4. The invention of claim 1 in which the light-measuring means includes a photoelectric cell illumined through the light-receiving aperture and an amplifier recorder electrically connected to the photoelectric cell.

5. The invention of claim 1 in which the light source means includes means for controlling the intensity of the light.

6. The invention of claim 1 in which an apertured diaphragm is interposed in the path of the beam of light between the light source means and the lens for converging light, the aperture in said diaphragm being substantially circular and smaller than the lens to limit the diverging cone of diffracted light originating at the light source means to an area less than the area of said lens at the plane in which said lens lies.

References Cited in the file of this patent

UNITED STATES PATENTS

| | | |
|---|---|---|
| 1,789,268 | Anderson | Jan. 13, 1931 |
| 1,974,522 | Twyman | Sept. 25, 1934 |
| 2,197,190 | Mott-Smith | Apr. 16, 1940 |
| 2,315,282 | Snow | Mar. 30, 1943 |
| 2,463,321 | Scott | Mar. 1, 1949 |

FOREIGN PATENTS

| | | |
|---|---|---|
| 396,390 | Great Britain | Aug. 1, 1933 |
| 577,395 | Great Britain | Mar. 16, 1946 |

OTHER REFERENCES

Ser. No. 400,876, Fukusima (A. P. C. application), published June 1, 1943 (now abandoned).